United States Patent [19]

Nagamine et al.

[11] Patent Number: 4,484,286
[45] Date of Patent: Nov. 20, 1984

[54] NUMERICAL CONTROL SYSTEM

[75] Inventors: Tsuyoshi Nagamine; Hideaki Kawamura; Mitsuto Miyata, all of Hachioji, Japan

[73] Assignee: Fujitsu Fanuc Limited, Tokyo, Japan

[21] Appl. No.: 258,780

[22] Filed: Apr. 29, 1981

[30] Foreign Application Priority Data

May 28, 1980 [JP] Japan .................................. 55-70997

[51] Int. Cl.³ ..................... G05B 19/403; G06F 15/46
[52] U.S. Cl. .................................. 364/474; 364/167; 364/900
[58] Field of Search ............... 364/474, 475, 167-171, 364/200 MS File, 900 MS File, 300

[56] References Cited

U.S. PATENT DOCUMENTS

| T977,007 | 12/1978 | Selander | 364/474 |
|---|---|---|---|
| 3,725,652 | 4/1973 | Konvalina | 364/474 |
| 3,778,775 | 12/1973 | Haring et al. | 364/900 |
| 4,038,533 | 7/1977 | Dummermuth et al. | 364/900 X |
| 4,118,776 | 10/1978 | Isomura | 364/474 |
| 4,172,289 | 10/1979 | Struger et al. | 364/900 |
| 4,204,253 | 5/1980 | van den Hanenburg et al. | 364/200 |

Primary Examiner—Joseph F. Ruggiero
Attorney, Agent, or Firm—Staas & Halsey

[57] ABSTRACT

A numerical control system for executing numerical control processing on the basis of a command program, and for actuating a machine in accordance with the results of the processing steps to machine a workpiece in the manner specified by the instructions in the command program. There are prepared a plurality of system variables, the values of which represent a variety of operational conditions of the machine or of a numerical control device. A user macro, having at least an identification and an instruction that employs the system variables, is stored beforehand in a memory. The command program is programmed to include a user macro call instruction. A prescribed user macro is read out from the memory by means of the user macro call instruction, thereby to allow processing in accordance with the user macro. For example, it is possible to execute processing upon reading out input/output interface signals, clock time and a variety of machine positions.

14 Claims, 11 Drawing Figures

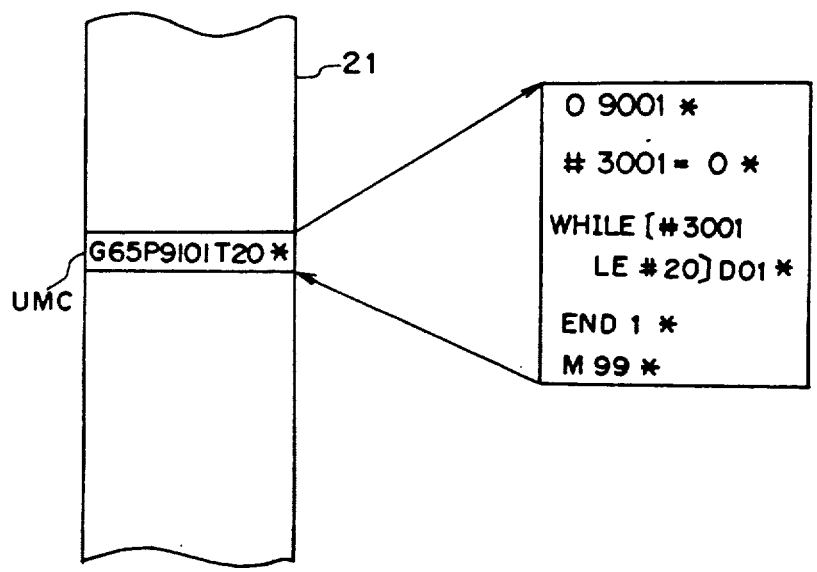

Fig. 5
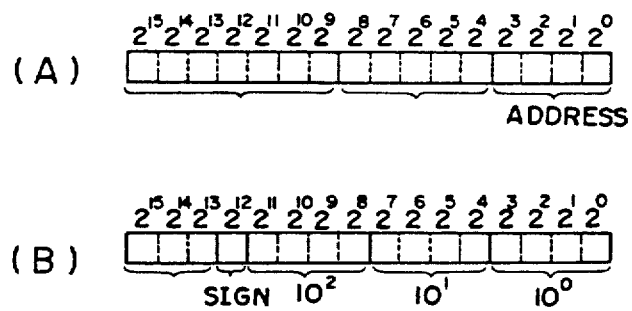
Fig. 7
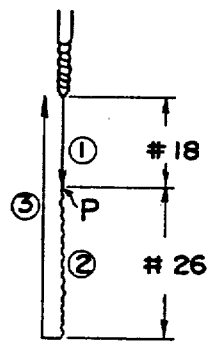
Fig. 8
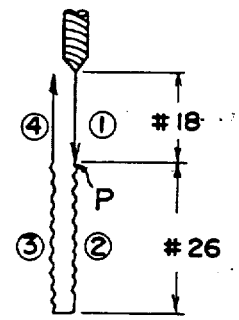
Fig. 9
(A)
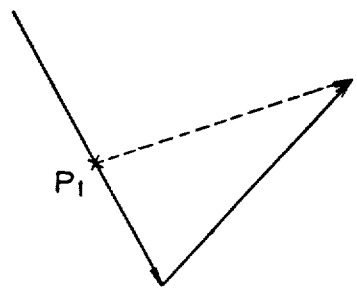
(B)
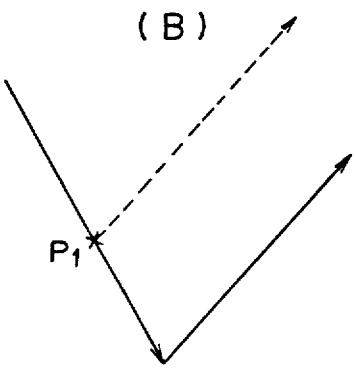

NUMERICAL CONTROL SYSTEM

BACKGROUND OF THE INVENTION

This invention relates to a numerical control system, and more particularly, to a numerical control system that permits the execution of a variety of special processes suited to the user's needs without requiring modifications in the software for the numerical control device.

A numerical control device is adapted to execute numerical control processing on the basis of a command program acquired from a paper tape or the like, a machine tool being actuated in accordance with the processing results so as to machine a workpiece in the manner specified by the program.

The conventional command program is composed of move commands, speed commands, miscellaneous function instructions that constrain a machine tool to perform prescribed operations, S-function instructions instructive of spindle speed, T-function instructions that command a tool change, preparatory function instructions and the like. Instructions for the execution of prescribed processes based on the status of the machine tool or numerical control device (hereinafter called NC) cannot be inserted into the command program with the conventional systems. Until now this inability to perform such processing has not caused any major inconvenience in the execution of ordinary numerical control but, as the demand for NC's of improved performance grows, so will the requirement for functions that allow processing in accordance with machine tool and NC conditions to be achieved by means of a command from the command program.

A numerical control device is a computer that includes a central processing unit (CPU), a control program memory and a data memory, and is adapted to control a machine tool on the basis of both a control program and a command program which the CPU obeys in executing the predetermined numerical control processing. The software for the computer numerical control device (hereinafter called CNC) of this type is created so as to make possible standardized control of machine tools. There are occasions, however, where specialized machine tool control is required for certain machines or in order to meet certain customer requirements even when identical machines are employed. In such instances it is conventional practice to modify the CNC software for the particular case to enable the execution of control in accordance with the specific specifications. In other words, it has been necessary for the NC manufacturer to modify the NC software in order to satisfy the particular machine tool control requirements. This has necessitated an exorbitant amount of time and labor and an increase in labor costs.

SUMMARY OF THE INVENTION

Accordingly, it is an object of the present invention to provide a low-cost CNC that does not require any modification of the CNC software even ifing from the machine tool and clock times, control for the transmission of output signals to the machine tool and control for the suppression of single block stop, as well as the control of operator message displays, the execution of these control operations conforming to the processing desired by the user without necessitating any modification of the CNC software.

Still another object of the present invention is to provide a numerical control system that makes it possible to improve CNC performance.

Other features and advantages of the invention will be apparent from the following description taken in connection with the accompanying drawings.

BRIEF DESCRIPTION OF THE DRAWINGS

FIG. 3 is a block diagram which is useful in describing a command program;

FIG. 4 is a block diagram which is useful in describing storage areas in a variable memory;

FIG. 5 is a diagram showing input/output data bit configuration;

FIG. 7 is a block diagram for describing a case in which the present invention is applied to a drilling operation;

FIG. 8 is a block diagram for describing a case in which the present invention is applied to a tapping operation;

FIG. 9 is a block diagram for describing a "skip" operation;

DESCRIPTION OF THE PRIOR ART

Figure 1:
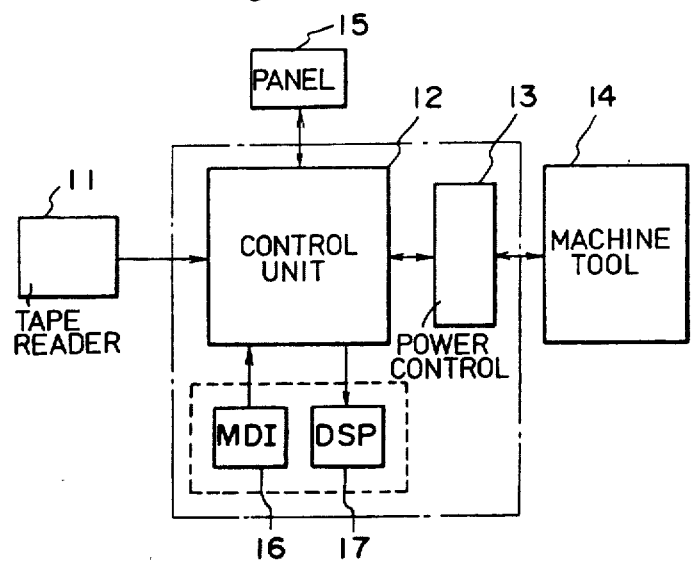
FIG. 1 is a block diagram of a numerical control device according to the prior art.

Before proceeding with a detailed description of the present invention, reference will first be had to FIG. 1 for a brief discussion of the conventional numerical control device.

A command program, read in block-by-block by means of a tape reader 11, is input to a control unit 12 that incorporates such hardware as a central processing unit and a control program memory. The control unit 12 executes numerical control processing in accordance with the command program and either actuates the servo motor (not shown) of a machine tool 14 so as to transport a table or cutting tool in the manner specified by a move command, or acts through a power sequence control unit 13 to control such operations as coolant flow and spindle rotation (forward/reverse/stop) on the machine tool side. A control panel 15 includes switches and buttons for instructing zero-point return and jog operations. A manual data input unit (referred to as an MDI hereafter) 16 is employed to input single blocks of command data manually. Numeral 17 denotes a display unit for displaying such information as the current position of the machine tool. The units 11 through 17, exclusive of the machine tool 14, constitute a computer numerical control device, or CNC. The control unit 12 of the CNC, as already mentioned, is a computer which has a central processor, control program memory and data memory, the processor executing prescribed numerical control process steps in accordance with the control and command programs in order to control the machine tool.

DESCRIPTION OF THE PREFERRED EMBODIMENT

Figure 2:
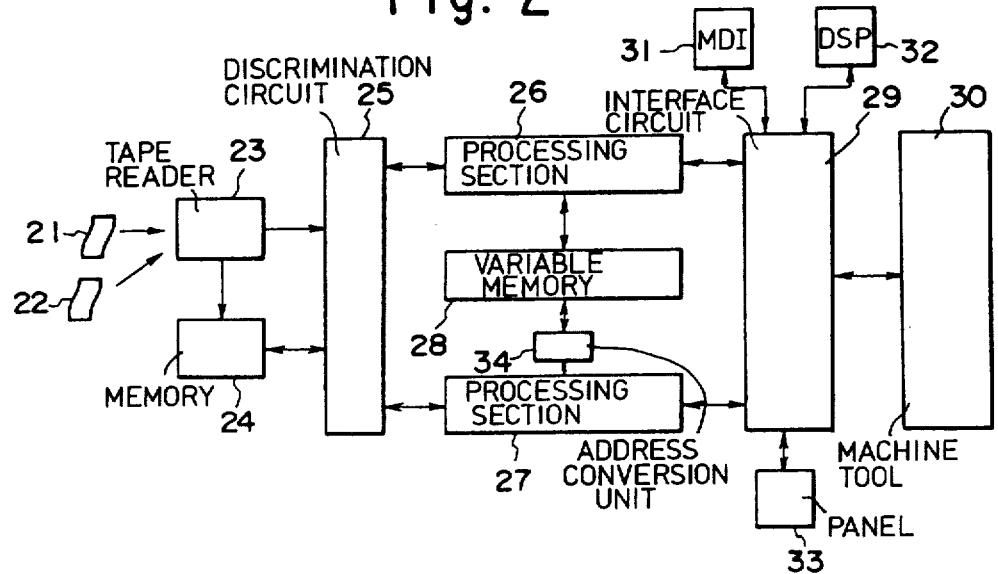
FIG. 2 is a block diagram of a numerical control device according to the present invention.

The block diagram of a CNC in accordance with the present invention is illustrated in FIG. 2. The system includes a paper tape reader 23 for reading the instructions that have been punched into paper tapes 21 and 22. The paper tape 21 is a command tape that carries the command program, and the paper tape 22 is a user macro command tape that carries a plurality of user macros. Each user macro is composed of at least (1) a macro identification (such as 0 9001) and (2) an instruction which employs system variables that will be described later, and is programmed with an indication such as M99* following the instruction (where the symbol "*" represents "end of block", and where "M99" represents "end of macro". An example of such a user macro is as follows:

0 9oo1 *
3oo1=o *
WHILE [#3oo1 LE #2o] D01
END1 *
M99 *

In the above, #i (i=3oo1, 2o) represents the system variable number. The program punched in the command tape 21 includes, in addition to the ordinary commands, a user macro call instruction UMC that allows a prescribed user macro to be called to enable processing in accordance with the user macro. The user macro call instruction includes, by way of example, at least the function instruction G65 (G-function instruction for calling the user macro), and P— — — ... — (where P is a word address indicating that — — — ... — is the macro identification).

Numeral 24 denotes a user macro registration memory for storing a plurality of macro instructions that have been read from the user macro command tape, Numeral 25 denotes a discrimination circuit that monitors the kind of information read in by the tape reader 23. If the information is a user macro (identified by the word address 0), it is transferred to the user macro registration memory 24 for storage there; if it is an ordinary instruction, it is transmitted to the next stage for ordinary processing, and if it is a user macro call instruction, the corresponding user macro is called from the user macro registration memory and transmitted to the next stage for user macro processing. It should be noted that the ordinary instructions and user macros are not mixed together and included on the same tape but enter from separate tapes.

Numeral 26 denotes an ordinary processing section for processing the ordinary instructions, numeral 27 denotes a user macro processing section for processing the user macros and, the ordinary processing sections 26 and 27 are shown, for example, in "The Technical Ins and Outs of Computerized Numerical Control", P. G. Mesniaeff, Control Eng., March 1971. Each section includes a processing unit, control unit and memory of its own. It is possible to construct the processing sections 26 and 27 so that parts are shared in common. Numeral 28 denotes a variable memory for storing the values of system variables when preparing a plurality of such variables in which the values are to represent a variety of machine or NC operative states. A system variable is represented by #i. Furthermore, i is the variable number by which a variety of system variables can be identified.

FIG. 4 shows the storage areas of the variable memory 28. It includes an input signal storage area DIA for storing, in the form of variables, 16-bit input signals from among the interface signals exchanged with the machine tool, an output signal storage area DOA for storing as variables 16-bit output signals from among the interface signals, a tool offset storage area TOF for storing as variables 99 types of offset quantities, a storage area TSF for storing as variables elapsed time measured from a standard time, single block suppression status and the like, a storage area GCA for storing modal information as variables, a storage area MST for storing M-function, S-function and T-function instructions and the like, a position storage area POS for storing as variables various machine positions, and a storage area RNA which is used in the processing of user macros. Information can be written into and read out from both the ordinary processing section 26 and user macro processing section 27, and each of the variables can be changed as desired.

The arrangement of FIG. 2 further includes an interface circuit 29 for supervising the input/output interface of the machine tool, display unit, tape puncher and the like. Numeral 30 denotes the machine tool, 31 an MDI, 32 the display unit, and 33 the control panel. Numeral 34 denotes an address conversion unit for converting the variable number i into an address of the variable memory 28.

It will be assumed that a plurality of user macros from the user macro command tape 22 have been stored beforehand in the user macro registration memory 24, followed by the input of the command program from the command tape 21. If the input command is an ordinary NC command, the NC command enters the ordinary processing section 26, and processing is executed in the conventional manner. If the command is a user macro call instruction, the discrimination circuit 25 calls the corresponding user macro from the user macro registration memory 24 and applies it as an input to the user macro processing section 27 to execute user macro processing as will be described below.

In the foregoing description, only the user macro has been stored in the memory 24, though it should be noted that both the user macro and command program can be stored there. In recent years, however, a method has been adopted in which the data on the command tape is stored beforehand in the memory, with numerical control processing being executed by reading out the stored NC commands sequentially. When NC processing is executed in accordance with this method, it is advantageous to store both the user macro and command program in the memory 24. Storing the user macro and command program in the memory 24 is accomplished by setting a selection switch, located on the control panel 33 of the NC, to the tape edit mode. For NC processing, the mode selection switch is set to the automatic mode.

The present invention will now be described in terms of its operation.

(A) USER MACRO REGISTRATION (a) User macros in connection with read-out and transmission of interface signals (output signals to, and input signals from, the machine side)

It will be assumed that ten dials are provided on the machine tool side for the instructing of certain quantities such as the amount of tool movement, and that the amount of tool movement is to be controlled on the basis of a prescribed dial setting (a decimal 3-digit number in Binary Coded Decimal hereinafter BCD) which is to be read out, the value of the dial setting depending upon the particular conditions. Assume that the value to be read out has been set by the third dial. Under such conditions, the following user macro would be prepared and registered in the user macro registration memory:

| | |
|---|---|
| 091oo* | (1) |
| #1132=#1132 AND 496 OR #1 | (2) |
| G65 P91o1 T60* | (3) |
| #1oo=BIN[#1o32 AND 4o95]* | (4) |
| IF[#1o12 EQ o] GO TO 91oo* | (5) |
| #1oo=−#1oo | (6) |
| N91oo M99* | (7) |

In the above user macro, (1) denotes the block that indicates the user macro identification, 09loo being the user macro identification for reading out three digits of BCD data. (2) denotes the block for transmitting the address data of the third dial. In accordance with the invention, data output to the machine side has a 16-bit structure as shown in FIG. 5A. The address data output to the machine side is written in the first through fourth bits ($2^0$ through $2^3$). Here the fifth through ninth bits ($2^4$ through $2^8$) are employed for other purposes, and no use is made of the 10th through 16th bits ($2^9$ through $2^{15}$). It will be assumed that the address data indicating the third dial has been written as a variable in a variable register corresponding to the system variable #1. Moreover, it will be assumed that the 16-bit data of FIG. 5A, delivered as an output by earlier processing, has been stored as a variable in a variable register corresponding to the system variable #1132.

In connection with the 3-digit decimal number 496, the fifth through ninth bits are at logical "1" and the other bits at logical "0". Therefore the data in the fifth through ninth bits of the system variable #1132 is preserved by the AND operation contained in (2), and the address data of the third dial which is now to be read out is written in the first through fourth bits of the system variable #1132 by the OR operation.

The line (3) is a user macro (which instruction will be described later) having a time duration (60 msec) to allow the output of the value set in the dial on the machine side after the address data in the line (2) has been sent to the machine side.

The line (4) is an instruction for reading out the value of the three-digit BCD, set by the dial, and for converting it into a binary number.

After a time lapse of 60 msec, the 16-bit data shown in FIG. 5B will have been delivered from the machine side and written in the register of the system variable #1032. In other words, #1032 is a system variable in which the output data serves as the value of the variable. In FIG. 5B, a BCD of three digits (the dial setting) is written in the 1st through 12th bits ($2^0$ through $2^{11}$), the sign thereof is written in the 13th bit ($2^{12}$), and the 14th through 16th bits are used for other purposes. Accordingly, when the AND is taken between 4095 (all "1"s) and the data in the variable register corresponding to #1032, the BCD of three digits which has been written in the 1st through 12th bits of the variable register is extracted, subjected to a binary conversion and then written in the register of the system variable #100. In (5), whether the sign is positive or negative is discriminated. If negative, the sign is reversed in (6). M99 in (7) ends the user macro. In (5), #1012 is the system variable in which the sign of the output data is the value of the variable. If the sign is positive, the value of the variable is logical "0"; if negative, the value is logical "1". EQ represents the sign of equality.

Figure 6:
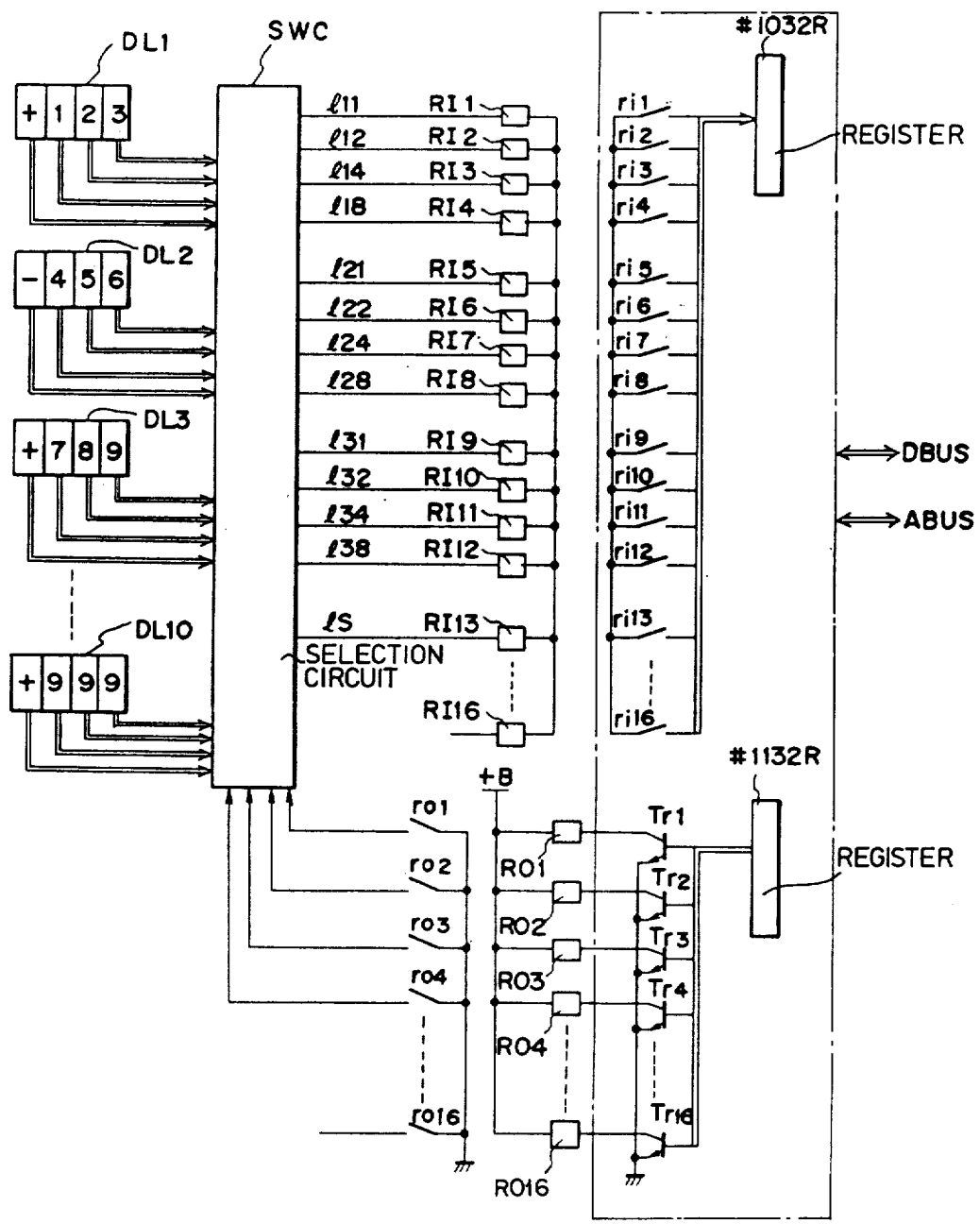
FIG. 6 is a block diagram which is useful in describing the inventive circuitry for reading remote dial settings.

FIG. 6 is a circuit diagram useful in describing the control operation for reading out the 3-digit BCD set by the third dial. In FIG. 6, #1032R, #1132R denote the variable registers corresponding to the system variables #1032 and #1132, these registers storing 16-bit input and 16-bit output data as variables, respectively. $RI_1$ through $RI_{16}$ denote input data relays, and $ri_1$ through $ri_{16}$ denote the contacts thereof. $RO_1$ through $RO_{16}$ denote output data relays, and $ro_1$ through $ro_{16}$ denote the contacts thereof. $Tr_1$ through $Tr_{16}$ are transistors, and $DL_1$ through $DL_{10}$ are dials for setting signed BCD's of three digits. SWC denotes a selection circuit. Since BCD's are used, four lines from each of the digits are connected to the input side of the selection switch SWC.

When the operations in the second block (2) of the user macro are executed, the address of the third dial $DL_3$ is set in the first through the fourth bits ($2^0$ through $2^3$) of the variable register #1132R. If we let the address of the third dial $DL_3$ be 0011, transistors $Tr_1$ and $Tr_2$ will conduct, and relays $RO_1$ and $RO_2$ will be actuated. Relays $RO_3$ and $RO_4$ will remain open. As a result, the selection circuit SWC delivers the signed BCD of three digits, which has been set by dial $DL_3$, to the lines $l_{11}$ through $l_{38}$ and to the line $l_s$. A high or low level signal will appear on lines $l_{11}$ through $l_{18}$ in accordance with the numerical value of the first digit of the BCD, on lines $l_{21}$ through $l_{28}$ in accordance with the numerical value of the second digit of the BCD, and on lines $l_{31}$ through $l_{38}$ in accordance with the numerical value of the third digit of the BCD. In consequence, the input data relays $RI_1$ through $RI_{13}$ will be turned on or off in accordance with the numerical values set by the dial $DL_3$ to store the value in the variable register #1032R. Later the numerical value stored in the variable register #1032R is acquired by the processing section through a data bus DBUS. This is followed by performing the operations (3) onward. Here ABUS is an address bus.

(b) User macro for obtaining clock time

The CNC possesses clocks of two kinds. The first clock counts time in one millisecond units and is used to count the time from the moment the power supply is turned on (the counted time is a variable). The second clock counts time in 0.1-hour (six-minute) units and is used to count the total time that the CNC has been in use (the total time is also a variable). Let us assume that there is a requirement for a special specification in which the user wishes the next machining process to be executed after a time lapse of 20 msec from a certain point in time. In such a case the user would prepare the user macro shown below. It should be noted that the variable representing the time that has passed since power supply turn-on is stored in the variable register corresponding to the system variable #3001, and that the variable representing the total time the CNC has been in use is stored in the variable register corresponding to the system variable #3002.

| | |
|---|---|
| 09101 | (1) |
| #1=#3oo1 | (2) |
| WHILE [#3oo1 − #1 LE #2o]D01* | (3) |
| END1* | (4) |
| M99* | (5) |

In the above user macro, (1) is the user macro identification, (2) is an instruction (initial setting) for setting the present time (the data in the register corresponding to the system variable #3001) in the variable register for the system variable #1, and (5) is an instruction indicating the end of the user macro. Furthermore, in (3) and (4), WHILE [conditional expression] DOm (m=1, 2 . . . )
ENDm are instructions for repeating the execution from the DOm block to the ENDm block while the conditional expression is satisfied. If the conditional expression is no longer satisfied, the block following the ENDm block is executed. LE (LESS or EQUAL) is equivalent to the symbol "≦", and (#3001−#1) represents substraction of the data in the variable register corresponding to the system variable #3001. It should be noted that 20 is stored in the variable register corresponding to the system variable #20. Accordingly, following a 20-millisecond time lapse, there is a shift to the instruction M99* to end the user macro processing if the conditional expression is no longer satisfied.

When the user macro (1) through (5) has been prepared it is then punched in the paper tape 22 and then read from the tape by the tape reader 23. The discrimination circuit 25 discriminates the word address 0 and then transfers the corresponding user macro to the macro registration memory 24 where it is stored. This completes the registration of the user macro for obtaining clock time.

It can be seen from the above that the user macro for obtaining the clock time resembles an ordinary DWELL function. A DWELL function, however, stops machine tool operation for a predetermined time period and then restores machine operation following the lapse of said time period. The user macro, on the other hand, enables clocking of a predetermined time period without stopping machine operation. In other words, it functions to enable clocking even during machine tool operation.

(c) Macro for single block stop suppression

In testing a command tape for correctness, so-called single block control ordinarily is carried out. According to such a control operation, the tape is stopped after each block and a shift to the next block does not take place until a cycle start button is pressed. The test for tape correctness requires time, however, and users may wish to suppress the single block control operation for certain blocks in order to save time. For example, this may be the case for blocks that are considered to be large in size, such as a drill block following positioning in a drill cycle, or a tool withdrawal block following the completion of drilling. When executing drilling as shown in FIG. 7, let us assume that the user wishes to suppress single block control in connection with the drill command block. To do so, the user would prepare the user macro shown below and register it in the macro registration memory 24. When the value of the system variable #3003 is a "1" in this example, the single block stop is suppressed; when a "0", the single block stop is cancelled.

| | | |
|---|---|---|
| O9o81* | macro identification | |
| #3oo3=1* | single block suppression | |
| GooZ−#18* | cutter positioned at point P | ① |
| Go1Z−#26* | drilling | ② |
| GooZ[#18+#26]* | tool withdrawal | ③ |
| #3oo3=o* | suppression cancellation | |
| M99* | end of macro | |

In the above, Goo is a G-function instruction for rapid traverse, and Go1 is a G-function instruction for linear cutting.

(d) Nullification of feed hold and feed rate override

When programming thread cutting and tapping, some users may wish to nullify feed hold or to maintain override fully. If such is the case, the user adopts #3004 as the system variable for the nullification of feed hold and override and decides in advance that a value of "1" for the system variable #3004 shall mean nullification and that a value of "0" shall mean cancellation of the nullification operation. By doing so, the user macro can be prepared and registered in the same manner as the single block stop suppression as described above. Shown below is one example of the user macro wherein the nullification of feed hold and override is applied to a tapping cycle G84 for executing the tapping operation shown in FIG. 8.

| | | |
|---|---|---|
| O9o84 | macro identification | |
| #3oo1=1* | single block stop suppression | |
| GooZ−#18* | cutter positioned at point P | ① |
| #3oo4=1* | nullification of feed hold, etc. | |
| Go1Z−#26* | tapping | ② |
| Mo5* | spindle rotation stop | |
| Mo4* | reverse spindle rotation | |
| Z#26* | spindle withdrawal | ③ |
| #3oo4=o* | cancellation of nullified feed hold, etc. | |
| Mo5* | spindle rotation stop | |
| Mo3* | forward spindle rotation | |
| GooZ#18 | | ④ |
| #3oo3=o | cancellation of single block suppression | |
| M99* | | |

(e) Modal information read-out

Modal information is information that, once previously defined, remains unchanged until the next definition. Examples are feed rate commands, several G function instructions such as G function instructions for incremental/absolute instructions, etc.

A command tape is programmed for incremental/absolute instructions, and a macro call instruction block is located between the first and second blocks of the absolute instructions. The user macro called by the macro call instruction comprising of incremental instructions. In this case, it is indicated at the beginning of the user macro by using a G function instruction (modal information) that the following move command is an incremental one. Until the following absolute instruction, therefore, the NC processes the move instructions as incrementals. If the absolute instruction of the first block is not restored at the end of the user macro, the move command of the second block will also be regarded as incremental and processed, giving rise to an erroneous operation. Accordingly, it is necessary to read out and preserve the modal information at the very beginning of the user macro, and to restore the modal information at the end of the user macro.

Shown below is an example of a user macro for a boring cycle (G86) illustrated in FIG. 7, in which the modal information (incremental/absolute G function instruction) is preserved and restored. It will be assumed that the above absolute G function instruction has been stored as a variable in the register corresponding to the system variable #4003.

```
O9o86*
#1=#4oo3*              modal information preservation
#3oo3=1*               single block stop suppression
GooG91Z−#18*           G91 is a G function instruction
                       indicating an incremental
                       movement
Go1Z−#26*
Mo5*
GooZ[#18+#26]*
Mo3*
#3oo3=o*               cancellation of single block stop
                       suppression
G#1M99*                modal information restoration
```

(f) Present position read-out

The user may wish to read out and then display or print out the present position of the machine tool, the instructed present position, etc. In such case the correspondance between system variables and their content is determined as shown in the following table.

| System variable | Positional information |
| --- | --- |
| #5001 | X axis block end coordinate |
| #5002 | Y axis block end coordinate |
| #5003 | Z axis block end coordinate |
| . | |
| . | |
| #5021 | X axis present coordinate |
| #5022 | Y axis present coordinate |
| #5023 | Z axis present coordinate |
| . | |
| . | |
| #5061 | X axis skip signal position |
| #5062 | Y axis skip signal position |
| #5063 | Z axis skip signal position |

First, "skip machining" is defined as a function wherein machine movement is stopped by an externally applied skip signal to by-pass the amount of movement remaining in the block, and to advance to the next block. The tool will move as shown in FIG. 9A when the next block is an absolute instruction, and as shown in FIG. 9B when the next block is an incremental instruction. The point P is where the skip signal is generated. The skip machining function can be used in various measurements and in the control of grinder dimensions.

When measuring depth in the direction of the Z-axis, the amount of movement instructed in the direction of the Z-axis is made larger than the actual depth, and a contact element such as a pressure sensing element is moved in the direction of the Z axis until it contacts the floor of the workpiece. At this time the skip signal is generated to immediately stop the machine. The depth in the Z direction can then be measured by reading out and then displaying or printing the present position on the Z axis at this time.

When effecting such a measurement, the user macro should be programmed in such a manner that the system variable #5063 is read out and either displayed or printed when the skip signal is generated.

Figure 10:
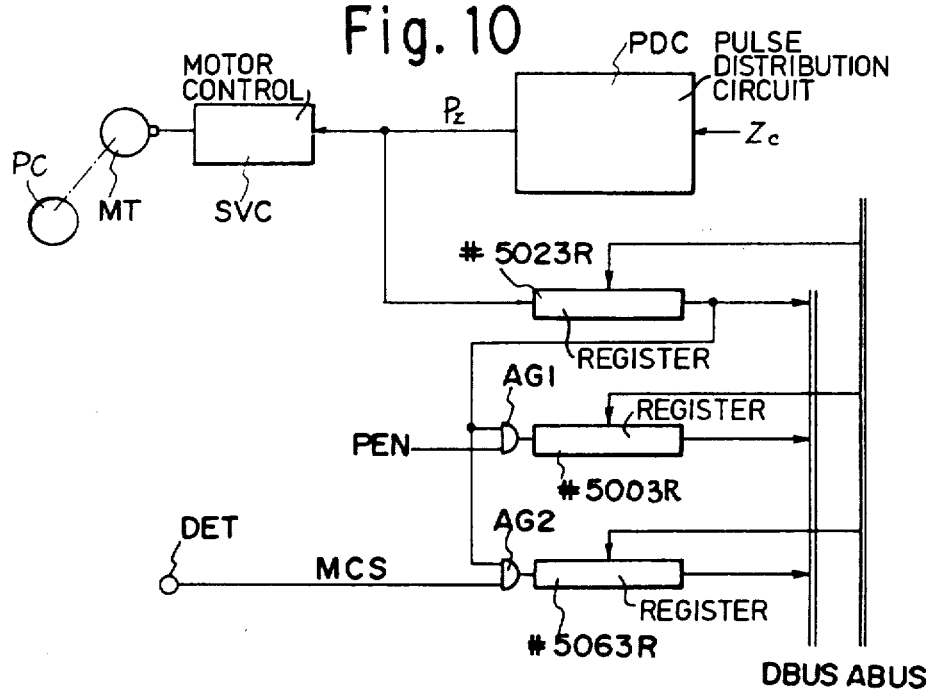
FIG. 10 is a block diagram for describing the control of a read operation for positional information along the Z-axis.

FIG. 10 is an illustrative view useful in describing read-out control of positional information in the direction of the Z axis. PDC denotes a pulse distribution circuit which performs a pulse distribution operation based on a commanded movement amount Zc in the Z-axis direction and generates distributed pulse Pz, SVC is a motor control circuit to drive a motor. MT is a Z axis drive motor, PC is a pulse coder connected to the shaft of the motor MT and adapted to generate a single pulse each time the motor rotates by a predetermined amount, DET is a detecting element for generating a skip signal MCS, $AG_1$ and $AG_2$ are AND gates, and #5023R and #5003R, #5063R are variable registers corresponding to the system variables #5023, #5003 and #5063, respectively, these registers storing, as variables, the Z axis block end coordinate, the Z axis present coordinate, and the Z axis position when the skip signal is generated.

When the distributed pulses Pz are delivered to the motor control circuit SVC to drive the motor MT, they are also given to the variable register #5023R. The variable register #5023R has its content up-counted or down-counted by the pulse Pz, depending upon the direction of motor rotation, thereby to store the present position of the machine at all times. Meanwhile, since a positioning end signal PEN is generated for each positioning operation at a commanded position, the content of the variable register #5023R is stored in the variable register #5003 each time the positioning is completed. In other words, the variable register #5003 stores the Z axis block end coordinate. Furthermore, when the skip signal MCS is generated during movement in the direction of the Z-axis, the content of the variable register #5023R at this time is stored in the variable register #5063R, so that the Z axis position at the time the signal MCS is generated, is stored in the register #5063R. The data in these variable registers is read out by commanding #5003, #5023, and #5063 in the user macro. More specifically, the variable numerals are converted into addresses by the address conversion section 34 in the FIG. 2, the addresses obtained by the address conversion are output over the address bus ABUS, and the content of the prescribed variable register is output over the data bus DBUS and received by the processing section. Herein, if a table or tool moves 5 μm for every one distributed pulse Pz, the processing section will perform a unit conversion operation in which the content of the prescribed variable register is multiplied by 5.

(g) Read-out and modification of tool offset amount

Though the amount of tool offset could previously be set solely by the operator, there are cases where the user may wish to set or to modify this quantity in the program. There are cases also where the user may want to know the amount of tool offset. In such cases, by matching the tool offset numbers 1, 2, ..., 99 with the system variables #2001, #2002, ..., #2099 and by using the expression #30=#2005 in the user macro, the offset quantity of offset number 5 can be stored in the variable register of the system variable #30. Further, by using the expression #2010=#8, the offset quantity of the offset number 10 can be modified in the content of the variable register of the system variable #8.

Figure 11:
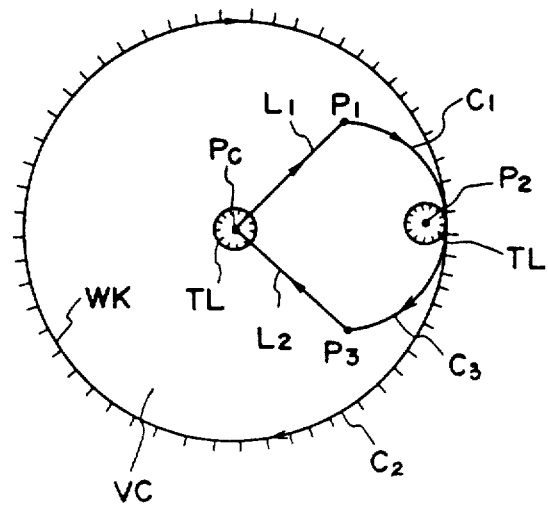
FIG. 11 is a block diagram for a case in which the present invention is applied to internal grinding.

FIG. 11 is an illustrative view useful in describing internal grinding by reading in tool offset quantities. To perform internal grinding in accordance with conventional practice, a tool TL was ordinarily positioned at the center Pc of a cylindrical portion VC formed in a workpiece WK, and was then moved along a path consisting of the straight line $L_1$, arc $C_1$, circle segment $C_2$, arc $C_3$, and straight line $L_2$, as illustrated in FIG. 11. Lately, however, a special method has replaced the internal grinding method of the type described, so that a standardized NC cannot perform internal grinding in the manner shown in FIG. 11. Nevertheless, there are cases where a user may wish to execute internal grinding in just such a manner. In accordance with the present invention, such a user would prepare the user macro shown below and would register it in the user macro registration memory 24. Then, by reading out the user macro call instruction from the command tape 21, the user macro would be called from the user macro registration memory 24 to execute internal grinding of the type shown in FIG. 11.

| | |
|---|---|
| O9olo* | (1) |
| #1 = ABS[#4] − #[2ooo + #7]* | (2) |
| IF[#1 LE O] GOTO 1* | (3) |
| #2 = #1* | (4) |
| #3oo3 = 1* | (5) |
| Go1x[#1 − ROUND(#2)]Y#2* | (6) |
| G17Go2x#2 Y − #2 R = #2* | (7) |
| 1 − #1* | (8) |
| X − #2 Y − #2 R#2* | (9) |
| Go1x[#1 − ROUND(#2)]Y#2* | (10) |
| #3oo3 = o* | (11) |
| N1M99* | (12) |

The radius of the cylindrical portion VC (FIG. 11) is stored in the storage area corresponding to the system variable #4. Likewise, the offset number is stored in the storage area corresponding to the system variable #7, the offset quantity is stored in the storage area corresponding to the system variable #[2000+#7], the value (offset radius) obtained by subtracting the offset quantity from the value of the radius of the cylindrical portion VC is stored in the storage area corresponding to the system variable #1, and the value of the radius of the arc $C_1$ is stored in the storage area corresponding to the system variable #2. Furthermore, "1" or "0" is stored in the storage area of the system variable #3003. If "1" has been stored, a single block stop is suppressed, and if "0" has been stored, the single block stop suppression is cancelled.

In the above, ABS means the absolute value, ROUND means to round to the nearest whole number, Go1 stands for linear interpolation, Go2 stands for circular interpolation in the clockwise direction, G17 stands for a G function instruction for designating the X-Y plane, and M99 stands for the end of the user macro. Accordingly, the identification number of the user macro is declared by (1), and the value (the value of the offset radius), resulting from the substraction of the offset quantity from the value of the radius of the cylindrical portion VC, is derived by (2). This value of the offset radius is stored in the storage area corresponding to the system variable #1. In (3) the value of the offset radius is compared with zero. If the value is negative, no action is taken and processing jumps to N1 to end the user macro; if the value is positive, processing shifts to (4). In (4) the value of the offset radius is halved, and in (5) the single block stop is suppressed. Then, in (6), linear interpolation is carried out to move the tool TL to the point $P_1$ along the straight line $L_1$. In (7) the tool TL is moved to the point $P_2$ along the arc $C_1$ to bring it into contact with the inner surface of the cylindrical portion VC. In (8), the tool is moved along the circle segment $C_2$ while grinding the inner surface and is returned to the point $P_2$. In (9), the tool is moved to the point $P_3$ along the arc $C_3$. In (10), the tool is returned to the center $P_c$ along the straight line $L_2$ to complete tool movement. Finally, in (11), suppression of single block stop is cancelled, and in (12), the user macro ends.

(h) Miscellaneous

It is possible to prepare and register a user macro for providing an alarm function, a function that allows a message to be displayed on a CRT, a function that enables a print out, and the like.

As one example, a user macro can be employed to measure a machining error following the completion of machining according to a certain program. This is accomplished by reading the output from an error measuring device provided on the machine tool, with the messages shown below being displayed on the CRT to give an indication of the magnitude of the error. For a small error which is within tolerance the following message would be displayed:

GO
ERROR = Δ Δ . . . Δ, whereas the following message would be displayed for a large error exceeding tolerance:

NO GO
ERROR = Δ Δ . . . Δ.

The operator permits machining to be applied to the next workpiece if the message reads GO, but discards the just completed workpiece if the message reads NO GO. He then adjusts such values as the tool offset quantity so that succeeding machining operations will produce finished works whose machining errors are within tolerance.

B. USER MACRO CALL INSTRUCTION

The user macro call instruction, by being programmed into the command tape beforehand, calls a prescribed user macro from the macro registration memory 24 to permit the execution of numerical control processing by means of the user macro processing section 27. At the very least, G65P (macro identification) is commanded.

When the tape reader 23 reads in instructions from the command tape 21, the discrimination circuit 25 determines whether the instruction is a user macro call instruction. If it is not, the ordinary processing section 26 executes ordinary processing in controlling the machine tool. If the instruction specifies a user macro call, however, a user macro, having a user macro identification indicated after the word address P of the call instruction, is called from the macro registration memory 24 and sent to the user macro processing section 27 so that macro processing may be executed. Thus, the machine tool is controlled in accordance with the user macro.

In accordance with the present invention as described above, CNC software is prepared in such a manner that a plurality of user macros are registered in advance, with a predetermined one of them being called by a user macro call instruction to permit the execution of macro processing in accordance with the called user macro. This allows a user to carry out specialized machining control operations, if the need should arise, without modifying the CNC software. The user need only prepare the user macro for the specialized machining operation, store it in the macro registration memory, and then program the user macro call instruction into the command tape 21. This makes it possible to eliminate the time and labor heretofore required for software modification, and to provide a low-cost CNC that can be tailored to the user's demands. Moreover, employing a user macro makes it possible to realize specialized specifications that match the particular machine and system, as well as canned cycles and automatic programming tailored to the user's needs.

Although the present invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A numerical control method for executing, in a numerical control device, numerical control processing on the basis of a command program and for actuating a machine in accordance with the results of said processing steps to machine a workpiece in the manner specified by the instructions in the command program, comprising the following steps:
   (a) preparing a plurality of instructions representative of first system variables, each of which is distinguished by a first variable number, the values of which represent a variety of operational conditions of the machine or of a numerical control device;
   (b) computing addresses of storage areas for storing the values of said first system variables by converting said first variable numbers into addresses;
   (c) storing said first system variables in said storage areas in dependence upon the converted addresses;
   (d) storing, in advance, a user macro in a memory, said user macro having at least an identification and an instruction that employs said system variables;
   (e) programming a user macro call instruction into the command program;
   (f) reading out a prescribed user macro from the memory by means of said user macro call instruction; and
   (g) executing numerical control processing for actuating the machine in dependence upon said user macro.

2. A numerical control method according to claim 1, further comprising a preparing step of:
   preparing second system variables, the values of which represent the states of signals transmitted from the machine to the numerical control device, each second system variable having a second variable number; and
   wherein said executing step (e) further comprises storing said second system variables in storage areas in dependence upon the second system variable numbers by executing said user macro.

3. A numerical control method according to claim 1, further comprising a preparing step of:
   preparing second system variables, the values of which represent the states of signals output from the numerical control device to the machine, each second system variable having a second system variable number; and
   wherein said executing step (e) further comprises storing said output signals in storage areas in dependence upon said second system variable numbers and transmitting said output signals to the machine by executing said user macro.

4. A numerical control method according to claim 1, further comprising a preparing step of:
   preparing a second system variable, the value of which represents the machine position, the second system variable having a second system variable number; and
   wherein said executing step (e) further comprises storing said second system variable which represents the machine position in a storage area in dependence upon the second system variable number, reading out the machine position using said second system variable number by said user macro, and executing prescribed numerical control processing on the basis of said machine position.

5. A numerical control method according to claim 1, further comprising a preparing step of:
   preparing a second system variable the value of which represents elapsed time, having a second variable number,
   wherein said executing step (e) further comprises storing the second system variable representing the elapsed time in a storage area in a dependence upon the second system variable number, reading out the second system variable representing the elapsed time using said second system variable number by said user macro, and executing prescribed numerical control processing on the basis of said elapsed time.

6. A numerical control method according to claim 1, further comprising a preparing step of:
   preparing a second system variable in the command program, the value of which represents the state of the numerical control device based on modal information, the second system variable having a second system variable number; and
   wherein said executing step (e) further comprises storing the said second system variable representing the modal information read out from the command program in a storage area in dependence upon said second system variable number, reading out the modal information using said second system variable number by said user macro, and executing prescribed numerical control processing on the basis of said modal information.

7. A numerical control method according to claim 1, further comprising a preparing step of:
   preparing a second system variable, the value of which represents information for rendering effective or ineffective functions such as a single block stop function and feed hold function, for the second system variable having a second system variable number; and
   wherein said executing step (e) further comprises storing said second system variable representing said information by means of said user macro in a storage area in dependence upon said second system variable number, and suppressing the functions such as the single block stop function and feedhold function as required.

8. A numerical control method according to claim 1, further comprising a preparing step of:
   preparing a second system variable, the value of which represents each of a variety of set values, the second system variable having a second system variable number; and
   wherein said executing step (e) further comprises storing said second system variable representing each set value in a storage area in dependence upon said second system variable number, reading out each set value using said second system variable number of said user macro, and executing prescribed numerical control processing on the basis of said variety of set values.

9. A numerical control method according to claim 1, further comprising the step of displaying messages on a CRT on the basis of the values of said first system variables.

10. A numerical control method for executing numerical processing with a numerical control device in dependence upon a command program, for actuating a machine and for executing special numerical control processing for actuating the machine, said numerical control device contains a clock counting elapsed time, said method comprising the steps of:
   (a) inserting in the command program a user macro call instruction;
   (b) storing a user macro program;
   (c) executing the command program for actuating the machine including said user macro call instruction;
   (d) retrieving said user macro program by means of the user macro call instruction;
   (e) numerical control processing for actuating the machine under the control of said user macro program, said user macro program comprising the steps of:
      (i) retrieving the elapsed time from said numerical control device;
      numerical control processing for actuating the machine can be easily introduced and performed by means of said user macro program without making extensive modifications of the command program.

11. A numerical control method for executing numerical processing with a numerical control device in dependence upon a command program where the command program contains modal information representing the state of the numerical control device, and for actuating a machine and for executing special numerical control processing for actuating the machine, said method comprising the steps of:
   (a) inserting in the command program a user macro call instruction;
   (b) storing a user macro program;
   (c) executing the command program for actuating the machine including said user macro call instruction;
   (d) retrieving said user macro program by means of the user macro call instruction;
   (e) numerical control processing for actuating the machine under the control of said user macro program, said user macro program comprising the steps of:
      (i) storing the modal information;
      (ii) executing numerical control processing for actuating the machine; and
      (iii) restoring the modal information to the control program; and
   (f) continuing execution of the command program, so that specialized numerical control processing for actuating the machine can be easily introduced and performed by means of said user macro program without making extensive modifications of the command program.

12. A numerical control method for executing numerical processing with a numerical control device in dependence upon a command program where the command program contains blocks for actuating a machine and for executing special numerical control processing for actuating the machine, and having an interface which contain a signal that represents that single block stop suppression is desired, that a feedhold command is to be nullified or that a feedrate command is to be overridden and contains an override feedrate, said method comprising the steps of:
   (a) inserting in the command program a user macro call instruction;
   (b) storing a user macro program;
   (c) executing the command program for actuating the machine including said user macro call instruction;
   (d) retrieving said user macro program by means of the user macro call instruction;
   (e) numerical control processing for actuating the machine under the control of said user macro program, said user macro program comprising the steps of:
      (i) retrieving the signal and the override feedrate; and
      (ii) returning control to the command program at a next block, after the feedhold command or with the override feedrate as the feedrate command in dependence upon the signal; and
   (f) continuing execution of the command program, so that specialized numerical control processing for actuating the machine can be easily introduced and performed by means of said macro program without making extensive modifications of the command program.

13. A numerical control method for executing numerical processing with a numerical control device in dependence upon a command program, for actuating a machine and for executing special numerical control processing for actuating the machine, said numerical control device includes offset storage and an interface which contains offset values, said method comprising the steps of:
   (a) inserting in the command program a user macro call instruction;
   (b) storing a user macro program;
   (c) executing the command program for actuating the machine including said user macro call instruction;
   (d) retrieving said user macro program by means of the user macro call instruction;
   (e) numerical control processing for actuating the machine under the control of said user macro program, said user macro program comprising the steps of:ng execution of the command program, so that specialized numerical control processing for actuating the machine can be easily introduced and performed by means of said user macro program without making extensive modifications of the command program.

14. A numerical control method according to claims 10, 11, 12 or 13, wherein said numerical control device includes a CRT display and wherein said user macro program further comprises the following steps:
   (a) retrieving values, signals, or information in storage in dependence upon what is stored as retrieved data; and
   (b) transmitting the retrieved data to said CRT display for display thereon.

* * * * *

UNITED STATES PATENT AND TRADEMARK OFFICE
CERTIFICATE OF CORRECTION

PATENT NO.  : 4,484,286
DATED       : NOVEMBER 20, 1984
INVENTOR(S) : TSUYOSHI NAGAMINE ET AL.

It is certified that error appears in the above-identified patent and that said Letters Patent is hereby corrected as shown below:

Col. 1, line 32, after "with" insert --values, signals, or information--;
      line 49, "instances" should be --instances,--;
      line 61, delete "ifing" and insert --if a specialized machine tool control is demanded.
        Another object of the present invention is to provide a CNC that is capable of executing control for reading machine tool function, various set values, modal information, input signals arriving--.

Col. 3, line 11, after "macros." insert --A user macro is a group of instructions which execute a particular operation and which can be required in a memory-like sub-program. This group of instructions can be provided by a user, can include variables and can perform calculations based on the variables. The variables can also be system variables.--.

UNITED STATES PATENT AND TRADEMARK OFFICE
CERTIFICATE OF CORRECTION

PATENT NO. : 4,484,286
DATED : NOVEMBER 20, 1984
INVENTOR(S) : TSUYOSHI NAGAMINE ET AL.

It is certified that error appears in the above-identified patent and that said Letters Patent is hereby corrected as shown below:

Col. 7, line 8, "2 ..." should be --2...)--;
     line 9, delete ")";
     line 16, "substraction" should be --subtraction--.

Col. 9, line 20, "spondance" should be --spondence--.

Col. 10, line 1, "$P_z$," should be --$P_z$;--;
     line 7, "MČS," should be --MCS;--;
     line 8, delete "and" (second occurrence) and insert --,--; and after "5003R" the comma "," should be --and--.

Col. 12, line 30, "B." should be --(B)--.

Col. 15, Claim 10 --A numerical control method for executing numerical processing with a numerical control device in dependence upon a command program, for actuating a machine and for executing special numerical control processing for actuating the machine, said numerical control device contains a clock counting elapsed time, said method comprising the steps of:

UNITED STATES PATENT AND TRADEMARK OFFICE
CERTIFICATE OF CORRECTION

PATENT NO. : 4,484,286

DATED : NOVEMBER 20, 1984

INVENTOR(S) : TSUYOSHI NAGAMINE ET AL.

It is certified that error appears in the above-identified patent and that said Letters Patent is hereby corrected as shown below:

a) inserting in the command program a user macro call instruction;

b) storing a user macro program;

c) executing the command program for actuating the machine including said user macro call instruction;

d) retrieving said user macro program by means of the user macro call instruction;

e) numerical control processing for actuating the machine under the control of said user macro program, said user macro program comprising the steps of:

i) retrieving the elapsed time from said numerical control device;

UNITED STATES PATENT AND TRADEMARK OFFICE
CERTIFICATE OF CORRECTION

PATENT NO. : 4,484,286
DATED : NOVEMBER 20, 1984
INVENTOR(S) : TSUYOSHI NAGAMINE ET AL.

It is certified that error appears in the above-identified patent and that said Letters Patent is hereby corrected as shown below:

ii) comparing the elapsed time to a predetermined time; and iii) returning to step i) herein if the elapsed time is less than or equal to a predetermined time; and f) continuing execution of the command program, so that specialized numerical control processing for actuating the machine can be easily introduced and performed by means of said user macro program without making extensive modifications of the command program. --.

Col. 16, Claim 13 --A numerical control method for executing numerical processing with a numerical control device in dependence upon a command program, for actuating a machine and for

UNITED STATES PATENT AND TRADEMARK OFFICE
CERTIFICATE OF CORRECTION

PATENT NO. : 4,484,286
DATED : NOVEMBER 20, 1984
INVENTOR(S) : TSUYOSHI NAGAMINE ET AL.

It is certified that error appears in the above-identified patent and that said Letters Patent is hereby corrected as shown below:

executing special numerical control processing for actuating the machine, said numerical device includes offset storage and an interface which contains offset values, said method comprising the steps of:

a) inserting in the command program a user macro cell instruction;

b) storing a user macro program;

c) executing the command program for actuating the machine including said user macro call instruction;

d) retrieving said user macro program by means of the user macro call instruction;

e) numerical control processing for actuating the machine under the control of said user macro program, said user macro program comprising the steps of:

UNITED STATES PATENT AND TRADEMARK OFFICE
CERTIFICATE OF CORRECTION

PATENT NO. : 4,484,286

DATED : NOVEMBER 20, 1984

INVENTOR(S) : TSUYOSHI NAGAMINE ET AL.

Page 6 of 6

It is certified that error appears in the above-identified patent and that said Letters Patent is hereby corrected as shown below:

i) retrieving the offset values from said interface;

ii) storing the offset values in an offset storage; and iii) numerical control processing for actuating the machine in dependence upon the offset values; and f) continuing execution of the command program, so that specialized numerical control processing for actuating the machine can be easily introduced and performed by means of said user macro program without making extensive modifications of the command program.--.

Signed and Sealed this

Twenty-second Day of October 1985

[SEAL]

Attest:

DONALD J. QUIGG

Attesting Officer

Commissioner of Patents and Trademarks—Designate